UNITED STATES PATENT OFFICE.

JAMES HYNDES GILLIES AND PERCY McPHERSON GILLIES, OF EAST CAMBERWELL, VICTORIA, AUSTRALIA.

TREATMENT OF ZINKIFEROUS ORES.

1,262,190.   Specification of Letters Patent.   Patented Apr. 9, 1918.

No Drawing.   Application filed January 22, 1917. Serial No. 143,819.

*To all whom it may concern:*

Be it known that we, JAMES HYNDES GILLIES and PERCY McPHERSON GILLIES, subjects of the King of Great Britain, residing at "Craigie Var," Mont Albert Road, East Camberwell, in the State of Victoria, Commonwealth of Australia, have invented certain new and useful Improvements in Connection with the Treatment of Zinkiferous Ores, of which the following is a specification.

This invention refers to the treatment of zinkiferous ores and more particularly to complex ores containing zinc and other metals 'such as occur on the west coast of Tasmania and in other parts of the world. These ores contain zinc blende and other sulfids in association, and may be treated fresh from the mine or in the form of tailings, concentrates and the like for the recovery of their several valuable contents.

Hitherto, attempts have been made to treat complex zinkiferous ores by ordinary leaching processes, in which the ores are very finely crushed, calcined to a dead roast, and treated with acid to dissolve the zinc contents. The solution thus obtained is electrolyzed to recover the zinc. It has been found difficult by this means to obtain the zinc in the roasted material in a condition readily soluble in acid, and the solution is, further, liable to be fouled with iron, copper and manganese, as well as arsenic, antimony, cadmium, et cetera.

According to our invention we utilize a process made up of a combination of metallurgical operations each in itself more or less well known, but not hitherto known and used, in combination, for the purposes of our invention.

We provide by our process, which includes dry and wet methods of extraction, certain improvements wherein the preliminary very fine crushing and dead roasting is avoided, and wherein the zinc is obtained as a fume in a condition readily soluble in acid and entirely free from iron, copper and manganese. The solution obtained is purified and is then treated in electrolytic cells for the recovery of metallic zinc.

In carrying our process into effect, the ore is coarsely crushed to pass through say a $\frac{1}{8}$ inch screen and is partially desulfurized by roasting. With ores yielding in the crushing operation an excessive amount of fines, it is advisable to separate the fines from the crushed material and submit them to a sulfatizing roast for the purpose of agglomerating the same by damping with water.

The amount of sulfur left in the material will depend upon its lead constituent; sufficient should remain to insure that the lead is obtained as a sulfate in the subsequent fuming operation hereafter referred to, and to provide for a sufficient quantity of $ZnSO_4$ in the fume to replace losses of $SO_4$ that may occur through losses of solution during working operations.

The roasted material is mixed with a proportion of carbonaceous material, preferably coke and after being damped with about 20% of water by weight, it is fed into a fuming furnace of the type having a perforated grate, through which a low pressure air blast is passed.

Zinc and lead in the ore are in this furnace volatilized and are drawn off in the form of fume which consists mainly of zinc oxid (ZnO) and lead sulfate ($PbSO_4$). This fume is cooled and collected in a baghouse or other fume collecting apparatus.

The sintered mass remaining in the furnace and known as clinker will contain gold, silver and copper values, as well as any zinc not volatilized. This is withdrawn from the furnace and smelted in an electric or suitable blast furnace with the requisite fluxes to obtain the copper, silver and gold in the form of a matte, and to volatilize zinc and lead that has escaped the fuming operation, such volatilized fume being collected in the main baghouse system.

In the treatment of the complex zinkiferous ores of Tasmania which contain zinc, lead, copper, arsenic, antimony, gold and silver values, the collected fume, we have found, consists mainly of zinc oxid and lead sulfate, with small quantities of arsenical and other volatile metallic compounds which, in the electrolytic treatment for the recovery of zinc, act detrimentally to the efficient working of the process and should therefore be removed, as will be hereinafter explained.

Having obtained the fumed zinc and lead compounds together with the accompanying impurities, we treat the same with sulfuric acid solution in a suitable apparatus to dissolve the zinc oxid. This acid solution comes from the electrolytic section of our process hereinafter referred to. The solution is then allowed to stand in order to settle out the lead sulfate which is collected and smelted, the amount of free acid remaining after treatment being from 1½ to 2 per cent.

This slightly acid solution containing zinc sulfate, with the salts of volatile metals such as arsenic, and antimony, is heated to about 80° centigrade and treated in suitable apparatus with sulfureted hydrogen ($H_2S$) gas to precipitate as sulfids these impurities. After settling, the clear solution is decanted and the sulfid sludge or precipitate filtered in a vacuum filter composed of porous tiles covered with a thin layer of diatomaceous earth.

In the event of cadmium being present it is advisable to pass the solution over granulated zinc before $H_2S$ treatment to remove the bulk of the cadmium, minute traces of which in the electrolyte do not seriously affect the deposition and quality of the zinc, whereas even very minute quantities of arsenic and antimony are likely to spoil the zinc deposit.

The purified zinc sulfate solution is then passed through electrolytic cells, in which zinc is deposited and a corresponding amount of $H_2SO_4$ liberated as free acid. The acidified solution is then again used to treat fresh batches of fume and so on cyclically.

Zinc plates are used as cathodes and pure lead as anodes, and we have found that a current density of 25 to 30 amps. per square foot of cathode surface yields the best results. A suitable cell for use with this part of our process is described in the specification attached to our Commonwealth of Australia Patent No. 16693, dated the 30th day of June, 1915.

To insure an even deposition of zinc, it is advantageous to use in the cells a colloidal addition agent such as gum arabic. We have found that if from one half to one gram of the addition agent be added per liter of the solution satisfactory results are obtained.

In the recovery of metallic zinc by electrolysis it is of prime importance to obtain a zinc sulfate solution as nearly free from arsenical and other like impurities as possible. From an impure solution, the impurities are deposited with the zinc and electrolysis is retarded, if not entirely suspended, when the solution becomes about 3 per cent. acid. But if the impurities are removed as herein explained, before electrolysis, we find that the latter will proceed efficiently until the solution approaches 10–12 per cent. acid. This acid solution is then pumped to a dissolver and is almost neutralized with a supply of fresh fume. By depositing zinc until the solution becomes strongly acid, the need for removing the acidified solution is less frequent, with consequent savings in working costs. Thus, apart from the great advantage of obtaining a pure or almost pure zinc deposit, we have in our process a longer continuity of electrolytic action and a resulting larger quantity of free acid with which to treat more fume.

Having now described our invention, what we claim as new and desire to secure by Letters Patent is—

1. The process of treating complex sulfid ores for the recovery of zinc which consists in fuming the crushed and semi-roasted ores, treating the fumed zinc oxid and lead sulfate with $H_2SO_4$ solution to dissolve the zinc oxid, purifying the zinc sulfate solution so obtained with $H_2S$ gas to precipitate the impurities as sulfids and electrolyzing the purified zinc solution, as specified.

2. In the treatment of complex sulfid ores of the kind indicated, fuming the zinc and lead from the crushed and semi-roasted ore in a furnace, retreating the clinker with ore in a furnace, retreating the clinker with fluxes to recover precious metals and copper and fuming off any remaining zinc, treating the zinc and lead fume with $H_2SO_4$ solution to dissolve the ZnO and the resulting zinc sulfate solution with $H_2S$ gas to precipitate arsenical and like impurities, and electrolyzing the purified solution to deposit metallic zinc, as herein set forth.

3. In the treatment of complex sulfid ores for the recovery of the valuable contents, the process which consists in coarsely crushing and partially desulfurizing the ore, collecting and treating the fines separately to a sulfatizing roast and agglomerating the same, fuming the semi-roasted ores in a furnace, retreating the furnace clinker, treating the zinc and lead fume with sulfuric acid solution to obtain zinc sulfate in solution and purifying the same with $H_2S$ gas to recover the arsenical and other like impurities therein prior to the solution being submitted to electrolysis, as and for the purposes specified.

In witness whereof, we have hereunto signed our names in the presence of two subscribing witnesses.

JAMES HYNDES GILLIES.
PERCY McPHERSON GILLIES.

Witnesses:
R. N. NEWTON,
D. CROWTHER.